United States Patent [19]
Duffy, Jr.

[11] Patent Number: 5,290,137
[45] Date of Patent: Mar. 1, 1994

[54] PIN BUSHING
[75] Inventor: William J. Duffy, Jr., Midlothian, Ill.
[73] Assignee: Illinois Tool Works Inc., Glenview, Ill.
[21] Appl. No.: 51,976
[22] Filed: Apr. 26, 1993
[51] Int. Cl.[5] .................. F16B 13/06; F16B 19/00
[52] U.S. Cl. .................................. 411/60; 411/41; 411/508
[58] Field of Search ............... 411/41, 60, 61, 57, 411/45–48, 15, 508, 509, 510

[56] References Cited
U.S. PATENT DOCUMENTS

| 3,136,350 | 6/1964 | Rapata . | |
|---|---|---|---|
| 4,263,833 | 4/1981 | Loudin et al. | 411/41 |
| 4,579,492 | 4/1986 | Kazino et al. | 411/60 |
| 4,874,276 | 10/1989 | Iguchi | 411/41 X |

FOREIGN PATENT DOCUMENTS

| 6706012 | 10/1968 | Netherlands | 411/60 |
|---|---|---|---|
| 1139976 | 1/1969 | United Kingdom | 411/60 |

Primary Examiner—Neill R. Wilson
Attorney, Agent, or Firm—Schwartz & Weinrieb

[57] ABSTRACT

A pin bushing having a body portion including a head member, a shank member and a tapered axial bore extending therethrough. First and second substantially perpendicular lateral slots extend through the body portion where the first slot enables insertion and initial retention of the shank within an aperture in an article and the second slot enables a pin to be releasably retained within the shank to lock the bushing within the aperture.

19 Claims, 1 Drawing Sheet

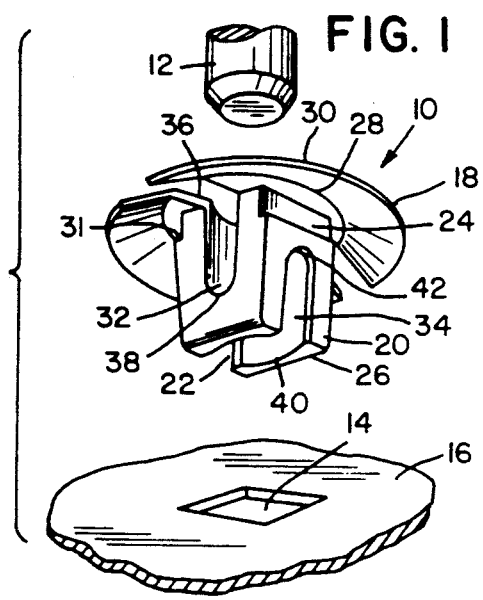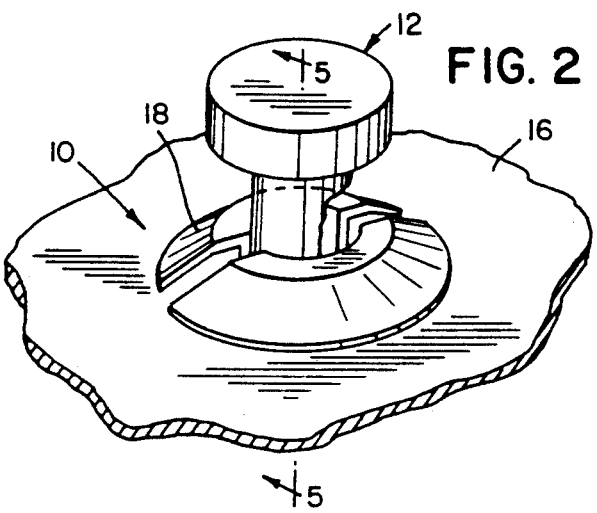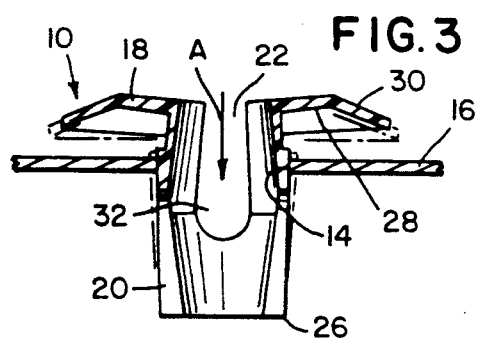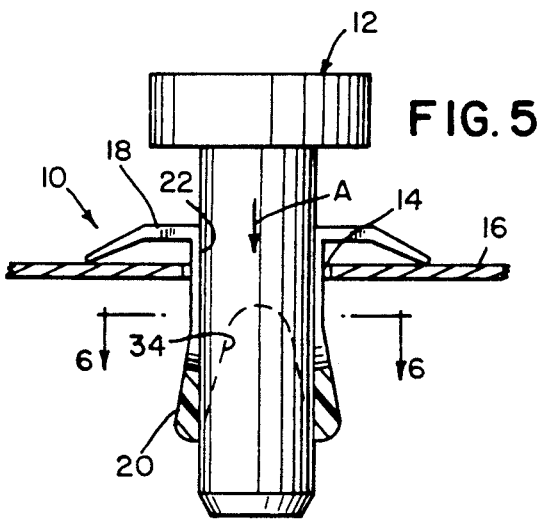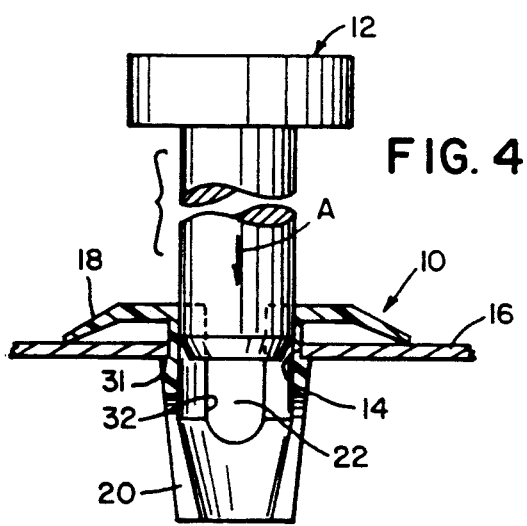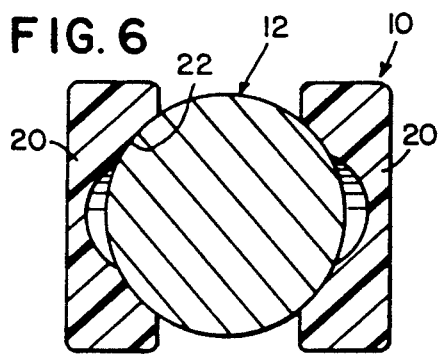

PIN BUSHING

BACKGROUND OF THE INVENTION

1. Field of the Invention

This invention relates generally to bushings, and more particularly to a one-piece pin bushing where the bushing can initially retain itself within an aperture of an article with a substantial retaining force and thereafter can accept and releasably retain a pin therein to lock the bushing within the aperture where the initial bushing retaining force is independent of the pin retaining force.

2. Description of the Related Art

Various types of fasteners are utilized in manufacturing to secure two panels or other articles together. These fasteners can include, for example, screw anchors, bushings and similar devices. An example of a screw anchor is disclosed in U.S. Pat. No. 3,136,350 which is assigned to the same assignee as the assignee herein. That patent discloses a screw anchor adapted to be inserted within an aperture of a workpiece for receiving a threaded fastener therein.

Pin bushings typically include a head portion and a shank portion and an axial bore extending therethrough. After the shank is inserted within an aperture of an article, a pin is pushed into the bore to outwardly expand a portion of the shank and lock the bushing within the aperture.

Such pin bushings, however, usually only have structure which retains the bushing in the aperture after insertion of the pin. Thus, they do not retain themselves within an article before insertion of the pin which can lead to difficulties in assembly.

It therefore would be desirable to provide a pin bushing which includes a first mechanism to initially retain the bushing within an aperture of an article before insertion of a pin and a second mechanism, independent of the first mechanism, which accepts the pin to lock the bushing within the aperture.

SUMMARY OF THE INVENTION

The invention provides a pin bushing including a body portion having a head member, a shank member, a tapered axial bore extending therethrough and first and second substantially perpendicular lateral slots. The first slot enables insertion and initial retention of the shank within an aperture in an article and is open to a front side of the head, extends axially through the head and into the shank a predetermined distance and laterally across the bore and through the shank. The second slot accepts and releasably retains a pin within the bore with a predetermined retaining force and is open to the distal end of the shank, extends axially into the shank a predetermined distance and laterally across the bore and through the shank. Upon insertion of the shank within an aperture and a pin within the axial bore, the bushing is locked within the aperture of the article until the pin is removed.

BRIEF DESCRIPTION OF THE DRAWINGS

Various other objects, features, and attendant advantages of the present invention will become more fully apparent from the following detailed description, when considered in connection with the accompanying drawings, in which like reference characters designate like or corresponding parts throughout the several views, and wherein:

FIG. 1 is an exploded perspective view of the bushing of the invention along with a pin and an article, such as a panel, having an aperture within which the bushing is inserted and retained;

FIG. 2 is a top perspective view of the bushing of the invention illustrated within the aperture and with the pin positioned in an intermediate driving position;

FIG. 3 is an axial cross-sectional view of a bushing of the invention as it is being inserted within the aperture;

FIG. 4 is an axial cross-sectional view of a bushing of the invention fully seated within the aperture and with a pin initially being inserted within the bushing;

FIG. 5 is an axial cross-sectional view taken along line 5—5 of FIG. 2 and in the direction indicated generally illustrating an intermediate driving position of the pin; and FIG. 6 is a lateral cross-sectional view of the bushing and pin taken along line 6—6 of FIG. 5 and in the direction indicated generally.

DESCRIPTION OF THE PREFERRED EMBODIMENTS

Referring to FIG. 1, the pin bushing of the invention is designated generally by the reference numeral 10. The bushing 10 is typically utilized with a pin 12 which is inserted within the bushing 10 to retain the bushing 10 within an aperture 14 of a panel or other article 16.

The bushing 10 is preferably molded from plastic and includes a head member 18, a shank member 20 and a longitudinal bore 22. The particular material and shape of the bushing 10 and pin 12 can vary so long as they function as described herein.

The head 18 is substantially is annular in shape and abuts the panel 16 to prevent the bushing 10 from continuing to move through the aperture 14. To take up slack and provide a seal between the bushing 10 and the panel 16, the head 18 is preferably somewhat flexible and has a conical cross-sectional configuration so that the head 18 can readily flex during insertion.

The shank 20 is illustrated as rectangular in cross-sectional configuration for insertion within a corresponding rectangular shaped aperture 14. The shank 20 and aperture 14, however, can be of any desired shape and may or may not be similar. For example, the shank 20 can be rectangular and the aperture 14 can be circular so long as it functions as desired.

The shank 20 has a predetermined length which varies depending upon the application and includes a first proximal end 24 and a second distal end 26. The first proximal end 24 is preferably integrally formed with a bottom side 28 opposite an upper side 30 of the head 18. To assist in maintaining the shank 20 within the aperture 14, the shank 20 can include a shoulder 31 which abuts a back side of the panel 16 after insertion as illustrated in FIG. 4.

The longitudinal bore 22 extends through both the head 18 and the shank 20, is slightly tapered as it extends away from the head 18 and is annular in cross-sectional configuration for cooperative engagement with the cylindrical pin 12. The shapes of the bore 22 and pin 12, however, can vary.

In order to insert and initially retain the bushing 10 within the aperture 14 with a substantial predetermined retaining force before insertion of the pin 12, the bushing 10 includes a first lateral slot 32. In order to accept, releasably retain and lock the pin 12 within the bore 22, the bushing 10 also includes a second lateral slot 34.

The first slot 32 extends laterally through the bushing 10 and includes a first open side 36 and a second closed side 38. The open side 36 is defined by the upper side 30 of the head 18 while the closed side 38 is defined by the shank 20. Accordingly, the first slot 32 is open to the upper side 30 of the head 18, extends axially through the head 18 and into the shank 20 a predetermined distance and extends laterally across the bore 22 and completely through the shank 20.

The second slot 34 also extends laterally through the bushing 10, includes a first open side 40 and a second closed side 42 and is formed substantially perpendicular to the first slot 32. The open side 40 is defined by the second distal end 26 of the shank 20 and the closed side 42 is defined by the shank 20. Accordingly, the second slot 34 is open to the distal end 26 of the shank 20, extends axially into the shank 20 a predetermined distance and laterally across the bore 22 and completely through the shank 20.

In use, as FIG. 3 illustrates, the shank 20 is initially inserted within the aperture 14 in the direction of arrow "A". During insertion, the first slot 32 enables the proximal end 24 of the shank 20 and the head 18 to flex toward the interior of the first slot 32 so that the shoulder 31 can clear the aperture 14. Thereafter, the shank 20 and head 18 snap back to substantially their initial positions to initially releasably retain the bushing 10 within the aperture 14 with a substantial predetermined retaining force.

As FIGS. 4 and 5 illustrate, to lock the bushing 10 within the aperture 14, the pin 12 is inserted further into the bore 22 in the direction of arrow "A". During insertion of the pin 12, the second slot 34 enables the shank 20 to flex outwardly toward the exterior of the second slot 34 thereby preventing the bushing 10 from being removed until the pin 12 is removed.

It is to be noted that the retaining force provided by the first slot 32 is independent from the locking retaining force provided by the second slot 34. Thus, the initial retaining force provided by the first slot 32 is not affected by insertion and removal of the pin 12. Accordingly, assembly and disassembly is easier since the bushing 10 will not unintentionally fall out of the aperture 14 before or after insertion of the pin 12.

Modifications and variations of the present invention are possible in light of the above teachings. It is therefore to be understood that within the scope of the appended claims, the invention may be practiced otherwise than as specifically described.

What is claimed and desired to be secured by letters patent is:

1. A pin bushing to be disposed within an aperture defined within a support panel, comprising:
  a body portion having a head member for engaging a first surface of said support pane, a shank member, and an axial bore extending through said head member and said shank member, said shank member having a first proximal end integrally formed with a back side of said head member, a second distal end, and means formed upon exterior surface portions of said shank member for snap-engaging a second surface of said support panel after said shank member has been inserted through said aperture of said support panel;
  a retaining pin for insertion within said axial bore of said body portion;
  first slot means, defined through said head member and said proximal end of said shank member connected to said head member, and within a first plane, for permitting said head member and said proximal end of said shank member to flex inwardly relative to said first plane so as to facilitate insertion of said shank member within said aperture of said support panel and to permit said head member and said proximal end of said shank member to thereafter flex outwardly relative to said first plane such that said exterior surface portion means of said shank member can engage said second surface of said support panel so as to initially retain said shank member therein with a predetermined retaining force; and
  second slot means defined through said distal end portion of said shank member within a second plane disposed perpendicular to said first plane for permitting said distal end portion of said shank member to flex outwardly relative to said second plane as said retaining pin is inserted within said axial bore of said body portion and thereby lock said bushing within said aperture of said support panel with a predetermined retaining force which is greater than said predetermined retaining force of said first slot means.

2. The bushing as defined in claim 1 wherein said first slot means is open to a front side of said head, extends axially through said head and into said proximal end of said shank a predetermined distance and laterally across said bore and through said shank.

3. The bushing as defined in claim 1 wherein said second slot means is open to said second distal end of said shank, extends axially into said shank a predetermined distance and laterally across said bore and through said shank.

4. The bushing as defined in claim 1 wherein said axial bore and both said first and second slot means are tapered.

5. The bushing as defined in claim 1 wherein said back side of said head has a conical cross-sectional configuration to take up any slack and provide a seal between said bushing and said support pane.

6. A bushing as set forth in claim 1, wherein:
  said aperture defined within said support panel, and said shank member, both have a substantially rectangular cross-sectional configuration.

7. A bushing as set forth in claim 1, wherein:
  said bushing is fabricated from a plastic material.

8. A bushing as set forth in claim 1, wherein:
  said exterior surface portion means of said shank member comprises a pair of oppositely disposed shoulders.

9. A bushing as set forth in claim 1, wherein:
  said axial bore and said retaining pin both have a substantially circular cross-sectional configuration.

10. A pin bushing to be disposed within an aperture defined within a support panel, comprising:
  a body portion having a head member for engaging a first surface of said support panel, a shank member, and a tapered axial bore extending through said head member and said shank member, said shank member having a first proximal end integrally formed with a back side of said head member, a second distal end, and means formed upon exterior surface portions of said shank member for snap-engaging a second surface of said support panel after said shank member has been inserted through said aperture of said support panel;

a retaining pin for insertion with said axial bore of said body portion;

first slot means, defined through said head member and said proximal end of said shank member connected to said head member, and within a first plane, for permitting said head member and said proximal end of said shank member to flex inwardly relative to said first plane so as to facilitate insertion of said shank member within said aperture of said support panel and to permit said head member and said proximal end of said shank member to thereafter flex outwardly relative to said first plane such that said exterior surface portion means of said shank member can engage said second surface of said support panel so as to initially retain said shank member therein with a predetermined retaining force; and second slot means defined through said distal end of said shank member within a second plane dispose perpendicular to said first plane for permitting said distal end of said shank member to flex outwardly relative to said second plane as said retaining pin is inserted within said axial bore of said body portion and thereby lock said bushing within said aperture of said support panel with a predetermined retaining force which is greater than said predetermined retaining force of said first slot means.

11. A bushing as set forth in claim 10, wherein:
said first slot means is open to a front side of said head member and extends axially through said head member and into said proximal end of said shank member a predetermined distance and laterally across said axial bore and through said shank member.

12. A bushing as set forth in claim 10, wherein:
said second slot means is open to said distal end of said shank member and extends axially into said shank member a predetermined distance and laterally across said axial bore and through said shank member.

13. A bushing as set forth in claim 10, wherein:
said first and second slot means are tapered.

14. A bushing as set forth in claim 10, wherein:
said back side of said head member has a conical cross-sectional configuration so as to take up any slack and provide a seal between said bushing and said support panel.

15. A bushing as set forth in claim 10, wherein:
said bushing is fabricated from a plastic material.

16. A bushing as set forth in claim 10, wherein:
said exterior surface portion means of said shank member comprises a pair of oppositely disposed shoulders.

17. A bushing as set forth in claim 10, wherein:
said axial bore and said retaining pin both have a substantially circular cross-sectional configuration.

18. The bushing as defined in claim 10 wherein said shank has a substantially rectangular cross-sectional configuration.

19. A bushing as set forth in claim 18, wherein:
said aperture of said support panel has a substantially rectangular configuration.

* * * * *